(12) United States Patent  (10) Patent No.: US 8,574,034 B2
Sgarabottolo  (45) Date of Patent: Nov. 5, 2013

(54) CUTTING AND EDGE-COATING REMOVAL HEAD TO BE MOUNTED ON CUTTING BENCHES OF SHEETS OF GLASS

(75) Inventor: Silvano Sgarabottolo, Teolo (IT)

(73) Assignee: Paolo Zanetti, Schio, (Vicenza) (IT)

( * ) Notice: Subject to any disclaimer, the term of this patent is extended or adjusted under 35 U.S.C. 154(b) by 359 days.

(21) Appl. No.: 12/737,673

(22) PCT Filed: Jul. 30, 2009

(86) PCT No.: PCT/EP2009/005510
§ 371 (c)(1),
(2), (4) Date: Feb. 3, 2011

(87) PCT Pub. No.: WO2010/015357
PCT Pub. Date: Feb. 11, 2010

(65) Prior Publication Data
US 2011/0130079 A1  Jun. 2, 2011

(30) Foreign Application Priority Data
Aug. 5, 2008 (IT) .................... VI2008A0189

(51) Int. Cl.
*B24B 27/00* (2006.01)

(52) U.S. Cl.
USPC ................. 451/70; 451/69; 451/461

(58) Field of Classification Search
USPC ............ 451/41, 57, 65, 69, 70, 178, 259, 461
See application file for complete search history.

(56) References Cited

U.S. PATENT DOCUMENTS

| 4,228,711 | A | 10/1980 | Insolio |
|---|---|---|---|
| 5,285,600 | A * | 2/1994 | Shepley ............... 451/54 |
| 5,446,312 | A | 8/1995 | Hsieh |
| 5,816,892 | A * | 10/1998 | Lunn ................. 451/21 |
| 6,336,849 | B1 * | 1/2002 | Konnemann ............ 451/259 |
| 6,386,956 | B1 * | 5/2002 | Sato et al. ............ 451/57 |
| 6,905,398 | B2 * | 6/2005 | Jeong ................ 451/57 |
| 7,014,540 | B2 * | 3/2006 | Nagel ................ 451/57 |
| 7,014,542 | B1 * | 3/2006 | Lu .................... 451/65 |
| 8,047,898 | B2 * | 11/2011 | Hwang et al. ......... 451/41 |
| 2006/0283020 | A1 | 12/2006 | Lisec |

FOREIGN PATENT DOCUMENTS

| DE | 34 03 682 | 8/1985 |
|---|---|---|
| FR | EP 1 777 201 A | 4/2007 |
| JP | 2003 335536 A | 11/2003 |

OTHER PUBLICATIONS

International Search Report—PCT/EP2000/005510.

* cited by examiner

*Primary Examiner* — Timothy V Eley
(74) *Attorney, Agent, or Firm* — Bucknam and Archer

(57) ABSTRACT

There is provided a cutting and edge-coating removal head for sheets of glass (V) coated by a film (S) to be mounted on cutting benches. The cutting tool (20) is positioned inside the edge-coating removal tool (10), consisting of a diamond-tipped disc, a cup grinder or spark grinder, a pad, a blade, or a brush with steel bristles.

7 Claims, 4 Drawing Sheets

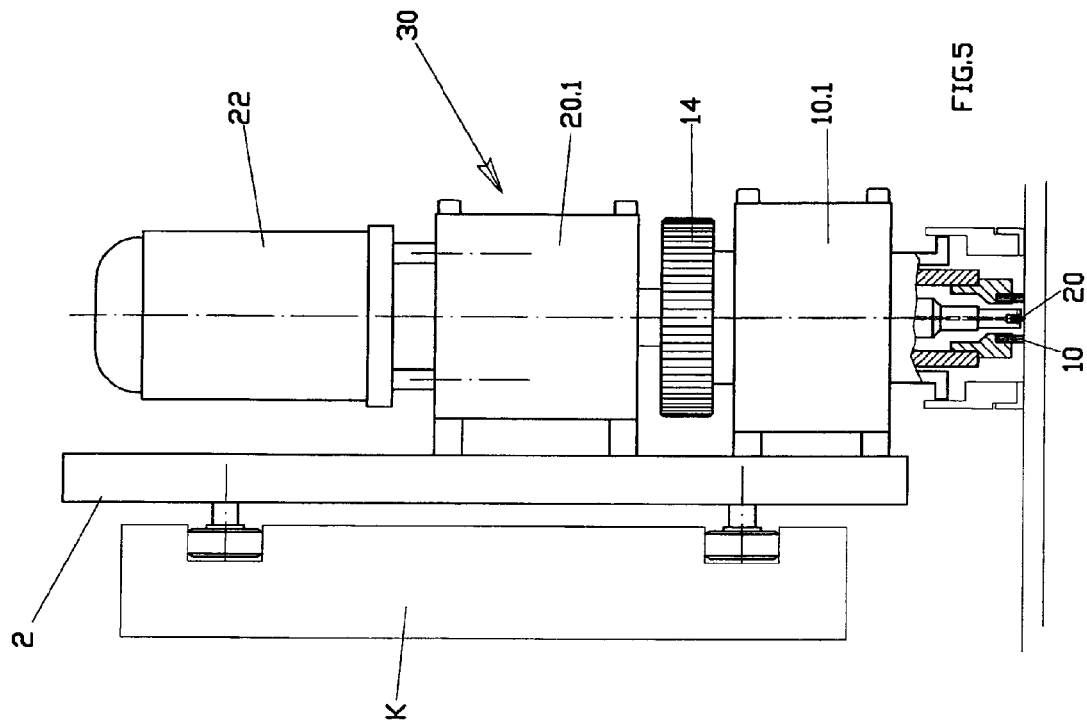
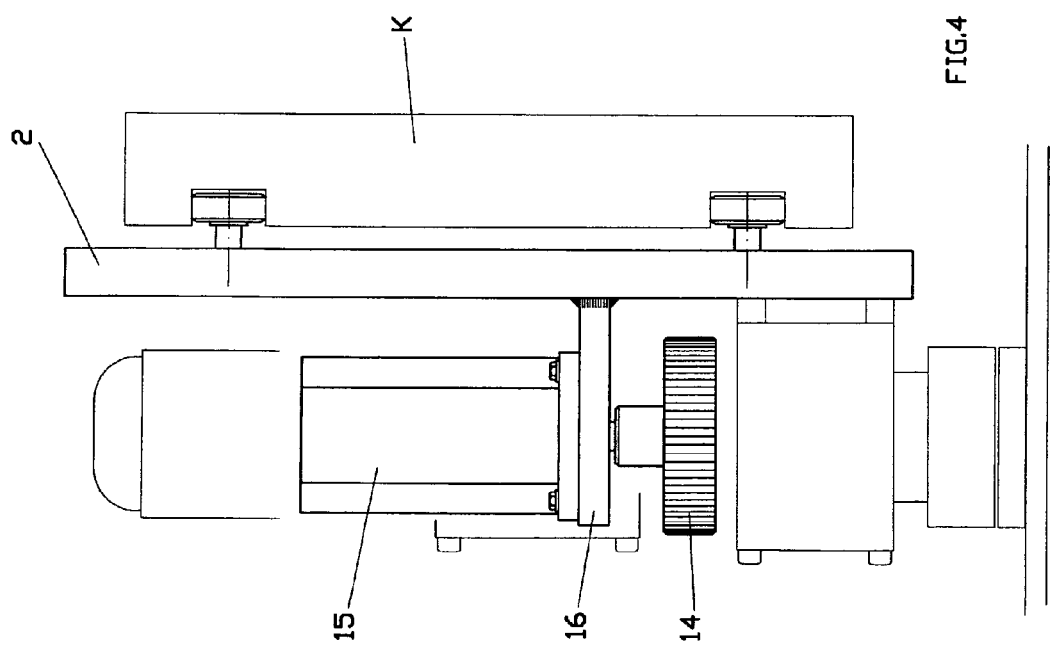

CUTTING AND EDGE-COATING REMOVAL HEAD TO BE MOUNTED ON CUTTING BENCHES OF SHEETS OF GLASS

CROSS REFERENCE TO RELATED APPLICATIONS

This application is the National Stage of PCT/EP2009/005510 filed on Jul. 30, 2009, which claims priority under 35 U.S.C. §119 of Italian Application No. VI2008A000189 filed on Aug. 5, 2008. The international application under PCT article 21(2) was published in English.

The present finding regards a cutting and edge-coating removal head to be mounted on cutting benches of sheets of glass, according to the general part of claim 1.

As known, made-to-measure glass is formed through a cutting operation on flat sheets of substantial size.

This operation is carried out through a machine known by the term "cutting bench", substantially consisting of a plane, on which the sheet of glass is arranged, with a bridging cross-piece on top, able to move longitudinally, on which the cutting head, equipped with the tool that cuts and causes the glass to break, is mounted so as to be able to slide.

Through the combination of the longitudinal forward movement of the cross-piece and the transverse forward movement of the cutting head, the cutting tool is given a rectilinear and/or shaped trajectory to obtain all possible shapes of the cutting profiles.

When the cutting operation is carried out on sheets of glass coated with a protective film like, for example, the one that covers low heat emission glass, used to make so-called "double-glazing", it is necessary to remove a portion of the aforementioned film, at the cutting line, before proceeding to the cutting operation.

Such an operation, known by the term "edge-coating removal", is carried out by inserting into the monoblock of the cutting head, in addition to the cutting tool, consisting of a disc with a cutting edge, an abrasive tool, such as a diamond-tipped disc, a cup grinder or spark grinder, a pad, a blade, or a brush with steel bristles or other types, which, rotating around their axis, continuously remove a portion of film.

In the state of the art the two tools, the one for cutting and the one for edge-coating removal, are supported, adjusted and moved through two mutually independent mechanisms, in which each comprises its own support structure for the tool and its own driving member; all of this thus means that the cutting head has to be constructively very complex, of substantial size and very heavy.

The purpose of the present finding is to make a cutting and edge-coating removal head, which does not have the drawbacks of similar known products.

Specifically, the purpose of the finding is to make a cutting and edge-coating removal head that is constructively very simple, of small size and low weight, with high performance and reliability over time.

Such purposes are accomplished by making a cutting and edge-coating removal head in which the cutting tool is positioned inside the edge-coating removal tool.

In particular, the two tools are mounted coaxially on a single support plate, able to slide on the bridging cross-piece.

Again in particular, the shaft that supports the cutting tool is connected directly to the motor that orients the aforementioned tool; moreover, the aforementioned motor is mounted floating on an operating cylinder applied to the support plate of the entire operating head.

The finding will be defined more clearly through the description of a possible embodiment thereof, given only as a non-limiting example, with the help of the attached tales of drawings, where:

FIGS. 4, 5 (Table (III) represent two side views of the head according to FIG. 1, FIGS. 6, 7, 8 (Table IV) represent the three operative conditions of the head according to FIG. 1, the edge-coating removal/cutting step, just the cutting step and just the edge-coating removal step, respectively.

Figure 1:
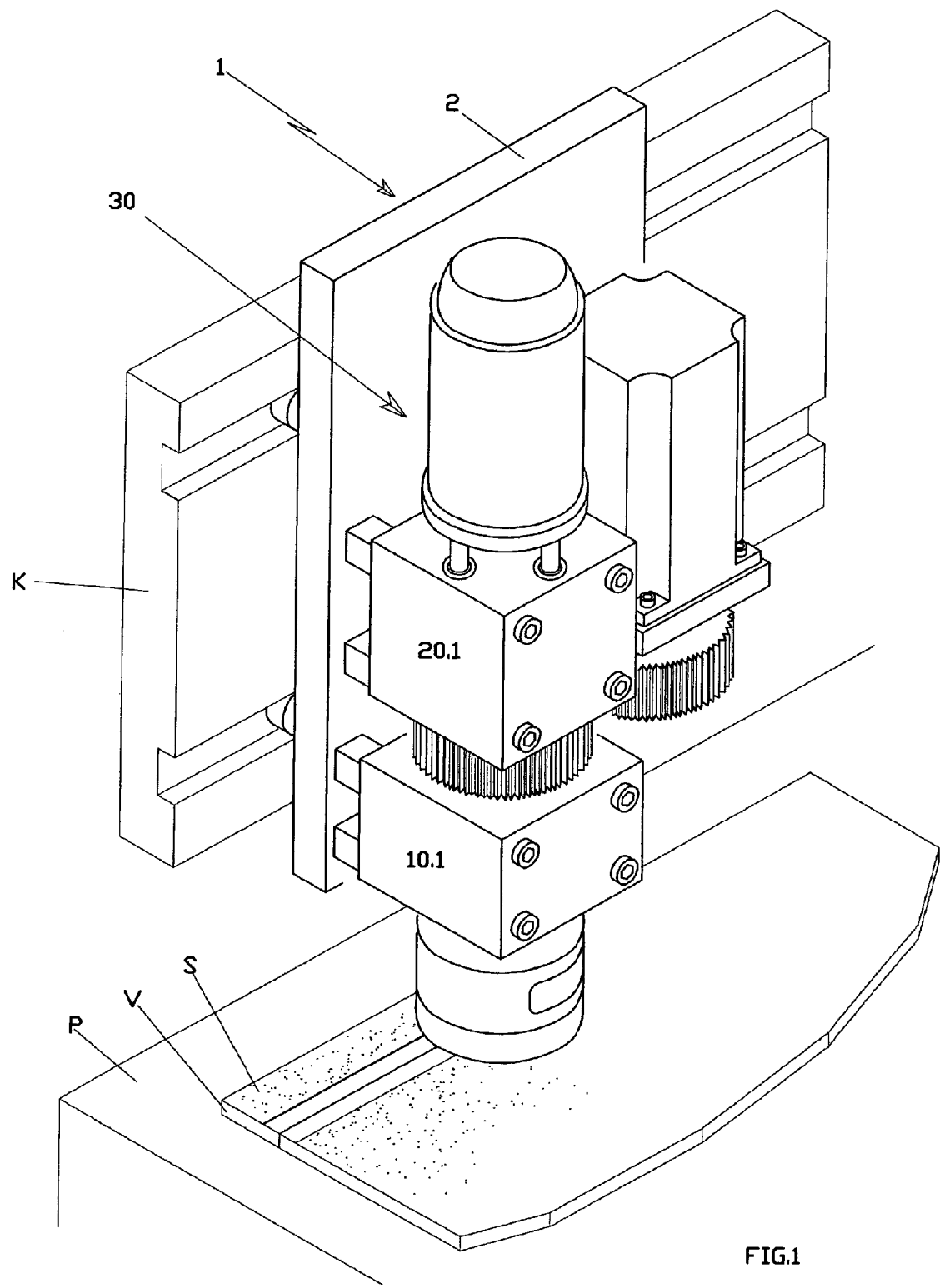
FIG. 1 (Table I) represents a perspective view of the cutting/edge-coating removal head according to the finding.

As can be seen in FIG. 1, the cutting and edge-coating removal head, wholly indicated with reference numeral 1, is able to slide on a bridging cross-piece "K" arranged over the plane "P", on which the sheet of glass "V" is arranged, coated with the film "S", all according to per se known methods.

The head 1 comprises a plate 2, onto which are applied the support and shifting members, indicated with reference numerals 10.1 and 20.1, of the two tools—the edge-coating removal tool, indicated with reference numeral 10, and the cutting tool, indicated with reference numeral 20, respectively.

Figures 2, 3:
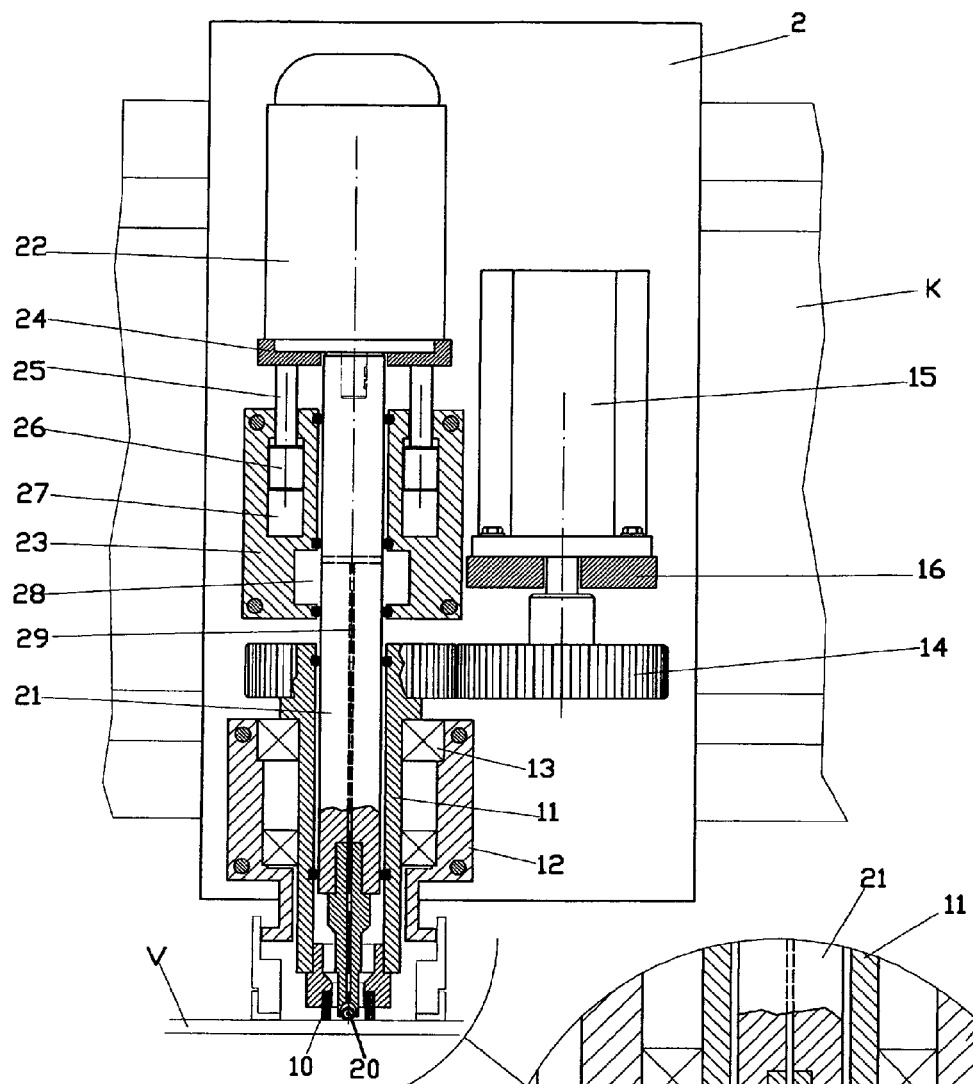
FIG. 2 (Table II) represents an elevated and sectioned view of the head according to FIG. 1.
FIG. 3 represents a detailed view of the cutting and edge-coating removal tools.

As can be seen in FIGS. 2-3, the two tools 10 and 20 are positioned at the base of a single drive column, wholly indicated with reference numeral 30, arranged coaxially to one another, in which the cutting tool 20 is contained inside the tool 10.

The edge-coating removal tool 10 is equipped with a tube 11 supported by a block 12, equipped with bearings 13 and applied to the plate 2.

The tube 11 is set in rotation through a pair of gears 14 actuated by a motor 15 mounted on a bracket 16, fixedly connected to the plate 2.

The cutting tool 20 is applied to the base of a pin 21, connected at the top to a motor 22, which gives the cutting tool the necessary cutting inclination and is supported so as to float by the pneumatic cylinder 23, fixedly connected to the plate 2.

Specifically, the base 24 of the motor 22 is applied to the stems 25 of the pistons 26 inserted in the chambers with variable volume 27 of the cylinder 23.

Again on the cylinder 23 there is an annular chamber 28, which allows the cutting tool 20 to be lubricated, through the channel 29, made on the pin 21.

From what has been described above, the cutting/edge-coating removal head 1 is very compact and small, since the entire cutting group 20.1 is coaxial with the edge-coating removal group 10.1 and the cutting tool 20 is actuated directly by the motor 22.

Figure 8:
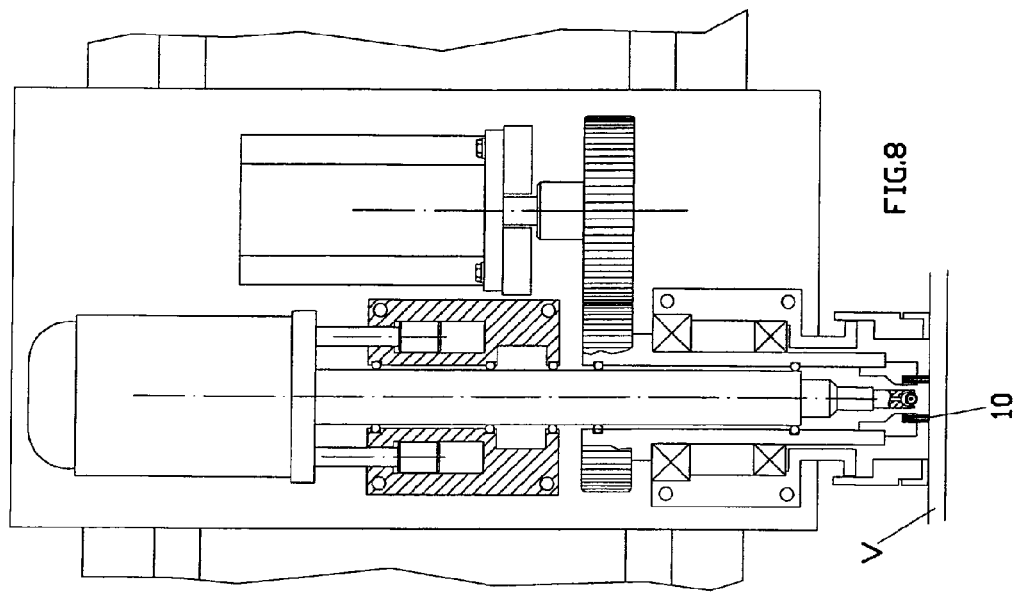
Figure 7:
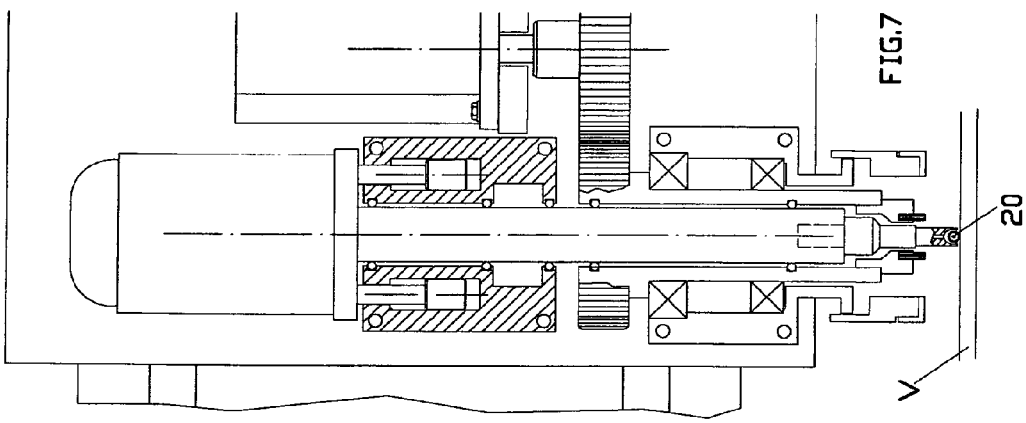
Figure 6:
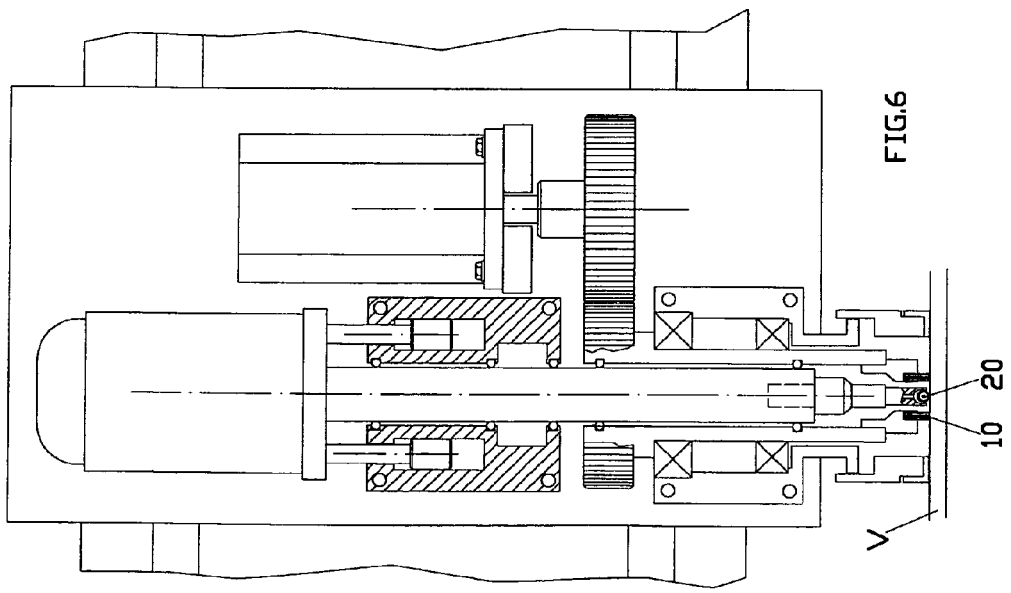

Moreover, the "floating" support of the cutting tool 20 allows the cutting head 1 to operate in the three working conditions, i.e. edge-coating removal/cutting (FIG. 6), just cutting (FIG. 7) or just edge-coating removal (FIG. 8), in a quick manner, having only to act upon the pneumatic cylinder 23, to adjust the axial position of the aforementioned tool, respectively, in line, projected or withdrawn with respect to the work plane of the edge-coating removal tool.

Of course, various embodiments of the finding are possible, according to the shape and size of its components, without, for this reason, departing from the scope of protection of the following claims.

The invention claimed is:

1. A glass cutting and edge-coating removal head mounted on a cutting bench and adapted for cutting sheets of glass coated with a protective film and for edge-coating removal of a portion of the film prior to cutting the glass wherein said head is mounted on a bridging cross-piece (K) of the cutting bench adapted for longitudinal movement above a plane (P) on which a sheet of glass (V) coated with a protective film (S) is arranged for cutting, said head comprising:

- a plate (2) adapted for transverse sliding movement on said bridging cross-piece (K),
- a cutting group (20.1) including a cutting tool (20) arranged at a base end of a pin (21) operatively connected at an upper end to a first motor (22) adapted to orient the cutting tool (20) for cutting the sheet of glass (V), and
- an edge-coating removal group (10.1) including an edge-coating removal tool (10) arranged at a base end of a tube (11) coaxially circumscribing said cutting tool (20) and pin (21), said tube (11) being adapted for axial rotation so that the rotation of the edge-coating removal tool (10) removes a portion of the film (S) from the glass sheet (V) to thereby allow the cutting of the glass sheet (V) by the cutting tool (20),
- said cutting group (20.1) and said edge-coating removal group (10.1) being mounted on said plate (2) so as to form a single drive column (30).

2. The glass cutting and edge-coating removal head as defined in claim 1, wherein said edge-coating removal group (10.1) further includes a support block (12) fixedly mounted to said plate (2) and having bearings (13) arranged in said support block (12) so as to rotatingly support said tube (11).

3. The glass cutting and edge-coating removal head as defined in claim 2, which further includes a second motor (15) fixedly mounted on said plate (2) and operatively connected to said tube (11) through a pair of gears (14) so as to axially rotate said tube (11).

4. The glass cutting and edge-coating removal head as defined in claim 1, wherein said cutting group (20.1) further includes an operating cylinder (23) fixedly mounted on said plate (2) and supporting said cutting tool (20), pin (21) and first motor (22) so that the axial position of said cutting tool (20) relative to said edge-coating removal tool (10) can be adjusted by operatively acting on said operating cylinder (23) whereby the position of the cutting tool (20) can be adjusted to be in line, projecting or withdrawn with respect to a work plane of the edge-coating removal tool (10).

5. The glass cutting and edge-coating removal head as defined in claim 4, wherein said operating cylinder (23) includes at least one variable volume pneumatic chamber (27) supporting a piston (26) connected via a stem (25) to a base (24) of said first motor (22).

6. The glass cutting and edge-coating removal head as defined in claim 4, wherein said operating cylinder (23) includes an annular chamber (28) surrounding said pin (21) and communicating with a channel (29) formed in said pin whereby said cutting tool (20) is lubricated.

7. The glass cutting and edge-coating removal head as defined in claim 1, wherein the edge-coating removal tool (10) comprises an abrasive tool adapted to remove a portion of the film (S) from the glass sheet (V).

* * * * *